(12) United States Patent
Losey (10) Patent No.: US 6,913,052 B2
(45) Date of Patent: Jul. 5, 2005

(54) TIRE WITH COMPOSITE PLY STRUCTURE AND METHOD OF MANUFACTURE

(75) Inventor: Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/442,002

(22) Filed: May 19, 2003

(65) Prior Publication Data

US 2004/0123937 A1 Jul. 1, 2004

Related U.S. Application Data

(63) Continuation-in-part of application No. 10/330,890, filed on Dec. 27, 2002.

(51) Int. Cl.[7] .......................... B60C 15/00; B60C 9/08; B29D 30/30; B29D 30/32
(52) U.S. Cl. ..................... 152/551; 152/553; 156/130.3; 156/132; 156/133
(58) Field of Search .............................. 156/130.3, 132, 156/133; 152/551, 553

(56) References Cited

U.S. PATENT DOCUMENTS

| 3,509,930 A | 5/1970 | Mirtain |
| 3,690,363 A | * 9/1972 | Guyot .................... 152/551 X |
| 4,024,901 A | 5/1977 | Poqué |
| 4,972,893 A | 11/1990 | Komai et al. |
| 5,513,686 A | 5/1996 | Diernaz |

FOREIGN PATENT DOCUMENTS

DE          43 10 714 A1    10/1994

* cited by examiner

*Primary Examiner*—Adrienne C. Johnstone
(74) *Attorney, Agent, or Firm*—David L. King; Richard B. O'Planick (57) ABSTRACT

The tire construction and method of building a tire 10 comprises the steps of cylindrically applying a pair of radial cord reinforced sidewall plies 17a, 17b, fixing the axial spacing between the bead cores; applying a crown ply 50, turning up each sidewall ply 17a and 17b to overlap lateral edges of the crown ply 50; moving the carcass assembly 18 axially inwardly while shaping the carcass assembly 18 toroidally to form ply turnups 20a, 20b axially inwardly of the bead cores 26. The method further comprises the steps of applying one or more belt reinforcing layers to the carcass and first reinforcing layer and applying a tread to form a pneumatic radial ply tread tire.

6 Claims, 7 Drawing Sheets

TIRE WITH COMPOSITE PLY STRUCTURE AND METHOD OF MANUFACTURE

RELATED APPLICATIONS

This patent application is a continuation-in-part of and claims priority to U.S. Ser. No. 10/330,890, filed on Dec. 27, 2002, entitled "Tire With Outside-In Ply Construction".

This invention relates to tires generally and more specifically to tires having a composite ply structure including at least two split plies of inextensible radial extending cords, most preferably of steel cords primarily for use in pneumatic truck tires having axially inner ply turnups, and a method of manufacturing such a tire.

BACKGROUND OF THE INVENTION

The use of radial steel cords in tires is well known in the tire art, earthmover and commercial truck tires have used steel corded tires for years.

As the use of steel cords was first tried in tires some common problems of how to consistently make a ply turnup of a steel cord reinforced ply had to be resolved.

Historically one must first ask the question of whether or not a ply turnup is even needed.

In 1921 Charles Miller in U.S. Pat. No. 1,393,952 taught that plies could be securely anchored to the beads by means of fabric strips having crossed strands relative to the ply cords without any of the plies actually wrapping around the bead core. Miller's tires showed that as few as four plies were possible, a breakthrough for the tires of that era.

In 1942, S. M. Elliott in U.S. Pat. No. 2,430,560 reported that farm tires could be made with greater elastic deformation if the bead wrapping fabric strips did not even contact the body plies. A radical departure from what was otherwise accepted practice.

In 1968, Fred Kovac and Grover Rye of Goodyear patented a bias tire leaving an outer ply having giant cords of 0.037 inches or greater. This outer ply comprised two parts, a bias body ply and a pair of radial bead plies. The edges of the bead plies overlapped the edges of the body plies and are sandwiched between them. Kovac et al indicated that the body ply may be of wire and the bead plies may be reinforced with fabric or filament. Kovac pointedly notes that if giant cords are used in the carcass, the plies containing them are so stiff that it is difficult for the tire builder to turn them around the beads. Thus, he recommended that the edges of the stiffer plies stop short of turning under the beads and bead plies of softer fabric are turned under the beads with their edges overlapping the edges of the stiffer plies.

Powers et al of The Firestone Tire & Rubber Company taught a radial play pneumatic tire having one or more body plies containing radially directed inextensible cords with the ply ends terminating on the same side of the bead bundle as the ply. The tire further having a bead connector ply containing radial, inextensible reinforcing cords which is wrapped about the bead bundle. Powers et al noted that a prior art British Patent No. 990,524 disclosed a radial ply body and a radial ply bead wrap, the cords of the body ply being rayon cords and the bead wrap being steel cord reinforced. Powers noted that the differences in modulus resulted in the cords not acting together as if they were one ply, whereas his all-inextensible cord design did act as one ply. Powers taught that the body ply and the bead connecting ply, where they are contiguous to one another, must be at least 20% and not greater than 50% of the peripheral distance of the body ply as measured from the midpoint of the bead bundle along the body ply to the point on the body ply where the edges of the tread ply are located. Powers suggest glass, steel or Kevlar cords could be first reinforcing layer and applying a tread to form a pneumatic radial ply tread tire. used. The Powers et al test tire was a 11–22.5 truck tire employing 1×4+6×4×0.175+1×0.15 radial cords of steel wire of a cable construction having 14 ends per inch. Similarly, the bead connector used the same steel wire construction. These truck tires carry a high operating inflation pressure of about 100 psi and the Powers et al patent demonstrated a potentially feasible concept although no known commercialization of such a truck tire had occurred.

In 1995, Ahmad et al disclosed a pneumatic tire having a discontinuous outer carcass ply. Ahmad et al disclosed a full radially inner ply with a conventional turnup end and a discontinuous outer carcass ply that extended from under the belt edges to the bead the outer ply being contiguously in contact with the inner ply.

EPO Publication 822195A2 discloses a Runflat Tire and Method which shows a runflat tire having multiple radial plies wherein at least one ply is wrapped about the bead and has a turnup, the remaining plies simply terminate near the bead. The bead area concept appears similar to the prior art solutions disclosed in Ahmad with the exception that the plies are spaced by fillers or inserts a common feature of runflat tires.

Steel ply turnups have historically provided tire designers very difficult challenges and the use of axially outer steel cord ply turnups generally have required long turnups to insure the folded end stays in place during tire building and subsequent vulcanization. Axially outer ply turnups anchor or secure the radial ply to the bead cores and have been long considered a necessity. The above reference prior art patents show a desire to avoid these turnups.

In a related patent application, the present inventor discovered that a reversal of the turnup from axially outside the bead core to axially inside the bead core could result in improved bead durability and significantly reduced weight in that area. In that patent application entitled "Tire With Outside-in Ply Construction", U.S. Pat. No. 10,330,890, filed Dec. 27, 2002, a novel truck tire ply construction, the contents of which are incorporated herein by reference in its entirety, the inventor discovered that the bead toe lifting problem could be minimized if the ply was located axially outside the bead core and the turnup portion was positioned axially inside the bead core.

The present invention provides a novel way of creating such a ply structure in a tire and another novel radial ply pneumatic tire made by this method.

SUMMARY OF THE INVENTION

The present invention provides a method for fabricating a tire utilizing an outside-in ply construction which torques the tire bead into the rim of the wheel to which it is mounted. The tire's outside-in ply construction also serves to pull down the toe of the tire, improving contact between the tire and the rim and to reduce rim indentation. The outside-in ply construction allows the rim to provide greater support for the tire. The increased rim support reduces toe lifting and facilitates the use of a smaller bead as compared to conventional truck tires. A smaller bead, combined with a smaller amount of rubber and reinforcement around and above the bead, reduces the tire's weight and material usage.

The method of building the tire having a carcass assembly having a pair of bead cores and a radial ply reinforcing structure has the steps of cylindrically applying a pair of radial cord reinforced sidewall plies, each sidewall ply having a width $W_P$; setting one bead core over each sidewall ply and fixing the axial spacing between the bead cores at a distance L; applying a crown ply having a width $W_C$, $W_C$ being less than the distance L and the crown ply being interposed between and spaced from each sidewall ply when applied; turning up each sidewall ply to fold over and overlap the lateral edges of the crown ply; moving the carcass assembly axially inwardly while shaping the carcass assembly toroidially to form ply turnups axially inward of the bead cores. The step of stitching the overlap of the sidewall plies to the crown ply is recommended.

Once toroidially shaped the method can further include applying a belt reinforcing structure to the toroidially shaped carcass, the first belt reinforcing layer having a width $W_B$, the first belt layer overlaps the radially outer ends of the sidewall plies. Then an additional one or more belt reinforcing layers can be applied to the carcass as well as the tread.

The resultant method can produce a tire according to the invention having a carcass having a pair of axially spaced bead cores, a pair of sidewall plies and a crown ply, each ply being reinforced with parallel radially extending cords, the sidewall plies extending axially outward along the sidewall partially overlapping the crown ply and extending radially inwardly to the bead core and folded from a position axially outside the bead cores to a position axially inside and wrapped around the bead cores to an axially inner turnup end. A belt reinforcing structure having at least two cord reinforced belt layers is preferably employed. A first radially inner layer and a second radially outer adjacent layer having equal but oppositely directed cords is most preferable. The first radially inner belt layer overlaps the crown ply and a radially outer portion of each of the sidewall plies.

The tire further employs a tread having an arc length $L_T$ extending between a pair of lateral tread edges. The overlapping of the sidewall plies relative to the crown ply occurs at a location axially inward of the lateral edges.

The sidewall ply cords are preferably steel or other highly inextensible material while the crown ply cords can also be steel, these-cords are preferably more extensible synthetic material such as nylon, polyester or rayon.

DEFINITIONS

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure. "Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Pneumatic tire" means a laminated mechanical device of generally toroidal shape (usually an open-torus) having bead cores and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that component which comprises a portion of the outside surface of a tire between the tread and the be "Shoulder" means the upper portion of sidewall just below the tread edge.

"Sidewall" means that portion of a tire between the tread and the bead.

"Tire industry standard size" refers to the series of letters and numbers used by tire manufacturers to define a tire's characteristics. The series includes such factors as tire width, aspect ratio (height to width), radial/bias type, rim diameter, speed rating, and load rating.

"Tread" means a molded rubber component which, when bonded to a tire casing, includes that portion of the tire that comes into contact with the road when the tire is normally inflated and under normal load.

"Tread Width or Tread Arc Width" means the arc length of the road-contacting tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 6:
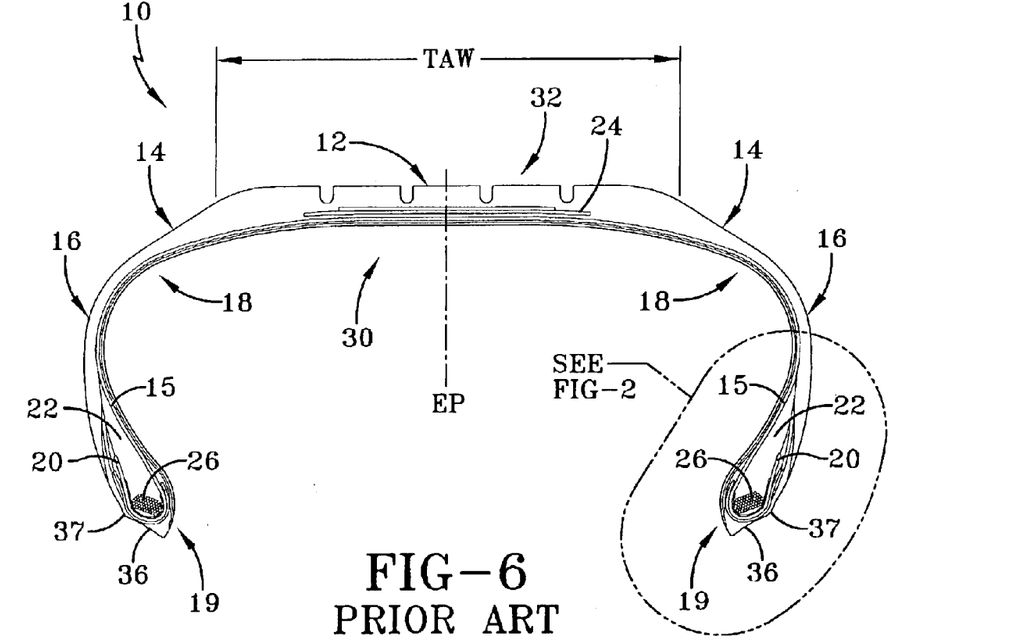
FIG. 6 is a cross-sectional view of the general construction of a prior art tire.

In the drawings the same numbers are used for the same components or items in the several views. With particular reference to FIG. 6, there is illustrated a cross-sectional view of the general construction of a prior art tire 100. The tire has a tread portion 12 and a pair of sidewalls 16 wherein the sidewalls are connected to the tread portion by shoulder regions 14. The tire may have one or more reinforcing belts 24. A carcass 18 of the tire includes one or more continuous radial plies 15, such as steel radial plies, extending from side to side. Bead regions 19 of the tire have a pair of axially spaced bead cores 26 around which are wrapped turn-up ends 20 of the radial plies 15. An apex 22 is sandwiched between the main body of the carcass 18 and the turn-up ends 20. Toes 36 and heels 37 provide a base for fitting the tire 100 to a wheel rim (not shown). FIG. 6 also illustrates the equatorial plane ("EP") and the tread arc width ("TAW") of the tire 100.

Figure 7:
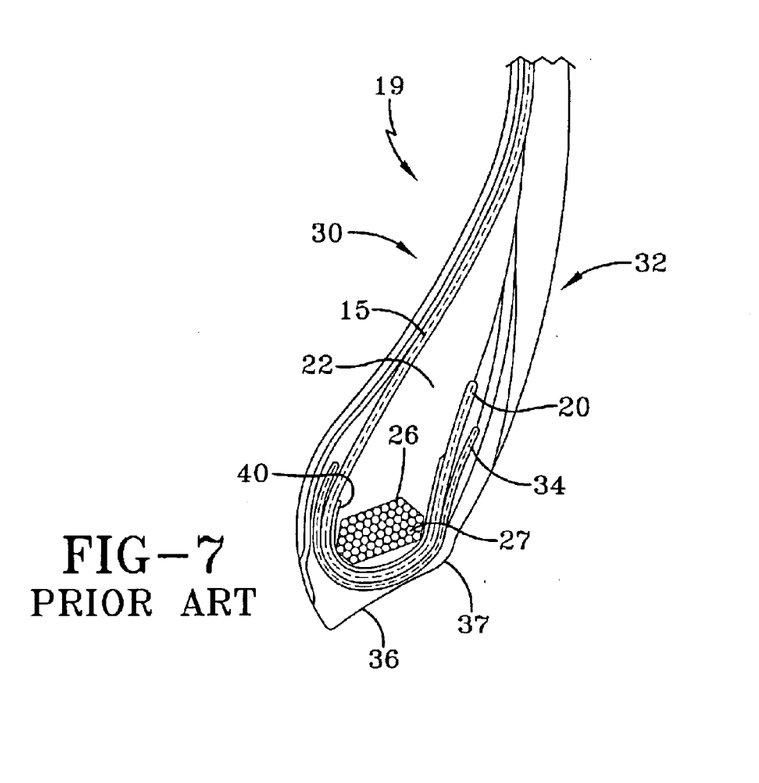
FIG. 7 illustrates an expanded cross-sectional view of the bead region of the tire of FIG. 1.

FIG. 7 illustrates an expanded cross-sectional view of the bead region 19 of a prior art tire. Each of the bead cores 26 has a substantially inextensible coil of round metal filaments 27. The wire gauge of the filaments may range from 0.050 to 0.080 inches. Typical sizes are 0.080, 0.072, 0.063 and 0.050 inch diameter. The bead may be made by winding a single filament into an annular configuration or by using multiple individual filaments. The number of winds or filaments may vary, depending upon the size of the tire. A small truck tire may have as few as 20 filaments or winds, while larger truck tires may utilize as many as 65 winds or filaments. A flipper 40, such as a nylon fabric ply, is wrapped around the bead 26 to prevent the filaments 27 from cutting through the surrounding plies and rubber. The flipper 40 is surrounded by a turn-up end 20 of a radial ply 15. The radial ply 15 is routed generally parallel to the interior 30 of the tire, wraps around the bead 26, and terminates with a turn-up end 20 generally parallel to the exterior 32 of the tire. A chipper 34 may be wrapped around a portion of the turn-up end 20 to act as a stiffness transition gradient.

Figure 3:
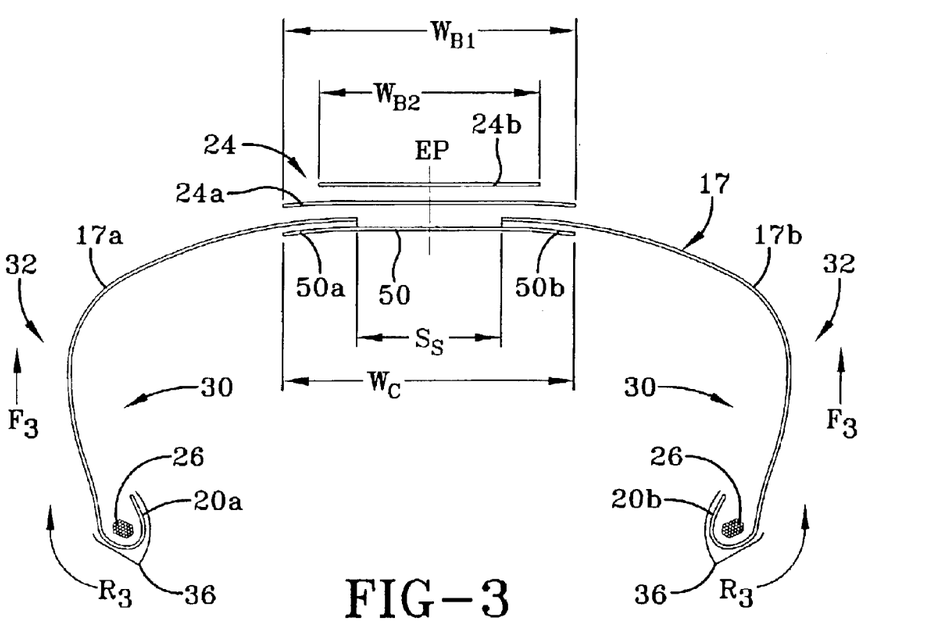
FIG. 3 is a schematic view of the sidewall portion of the tire of FIG. 1.
Figure 8:
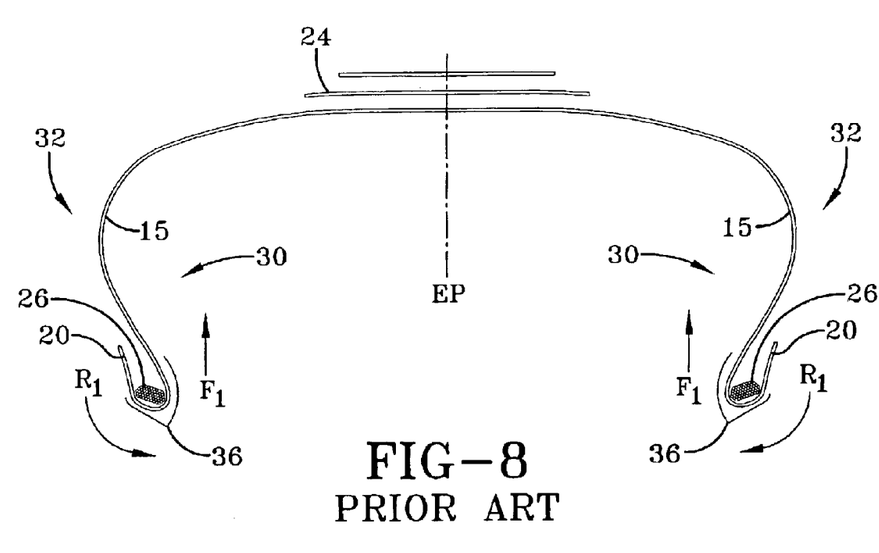
FIG. 8 is a schematic diagram of the prior art tire of FIG. 6.

A schematic diagram of a prior art tire is illustrated in FIG. 8. The tire may have one or more reinforcing belts 24. As can be seen, the turn-up ends 20 wrap around the bead cores 26 in an inside-out fashion with reference to the interior 30 and exterior 32. Under the pressure of inflation, the radial ply 15 exerts an inherent upward force $F_1$ as seen in FIG. 3. The force $F_1$ exerted by the radial ply 15 causes the bead cores 26 to rotate in a direction $R_1$, causing the toe 36 to lift away from the rim (not shown). Over time this lifting creates a permanent set in the bead area making it difficult if not impossible to remount the tire if it is ever removed from the rim. Additionally under the pressure of inflation and the forces experienced during use, the ply in a conventional tire tends to move toward the rim and rubber adjacent the rim is displaced. This results in a noticeable rim indentation.

Figure 1:
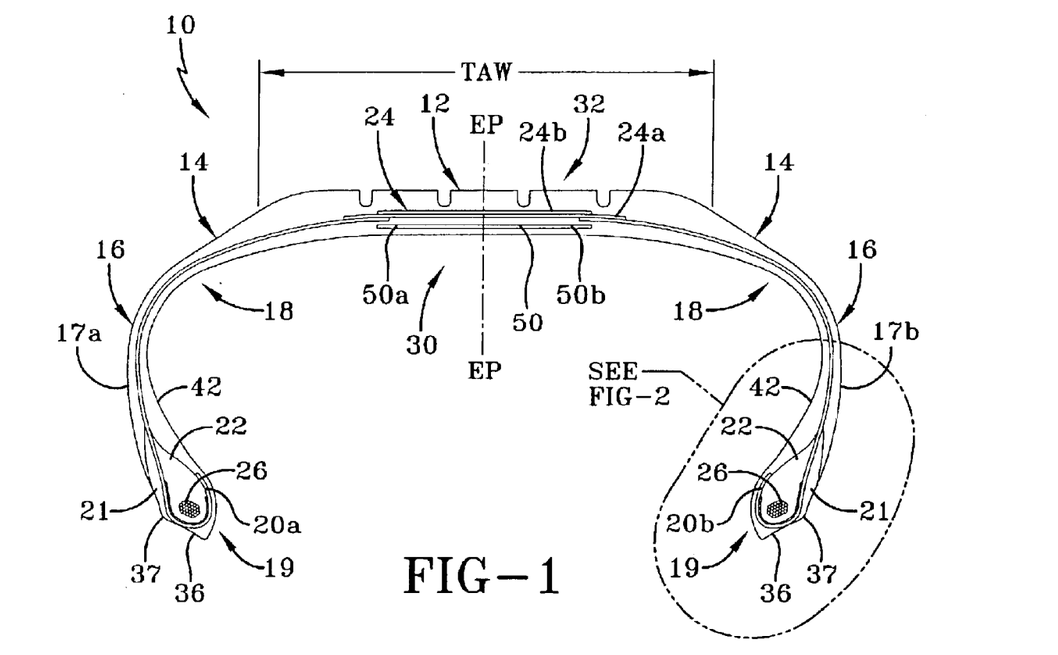
FIG. 1 is a cross-sectional view of the tire according to the invention.

FIG. 1 shows a cross-sectional view of the general construction of a tire 10 according to a preferred embodiment of the present invention in which the cord-reinforced radial sidewall ply is split. By splitting the sidewall ply, tires including one or more down plies can be built on a conventional tire building machine. The tire 10 has a tread portion 12 and a pair of sidewalls 16 wherein the sidewalls 16 are connected to the tread portion 12 by shoulder regions 14. The tire 10 may have one or more reinforcing belts 24. A carcass 18 of the tire includes two separate "split" sidewall plies 17a and 17b. Bead regions 19 of the tire 10 have a pair of axially spaced bead cores 26 around which are wrapped turn-up ends 20a, 20b of the radial down sidewall plies 17a, 17b. An apex 22 is sandwiched between the main body of the carcass 18 and the turn-up ends 20a, 20b. Toes 36 and heels 37 provide a solid base to ensure a snug fit of the tire 10 to a wheel rim (not shown). FIG. 1 also illustrates the equatorial plane ("EP") and the tread arc width ("TAW") of the tire 10. A crown ply 50 used as shown and for tubeless tires an air impervious liner 42 may also be used. The liner 42 is made preferably of halobutyl rubber by way of example.

Figure 2:
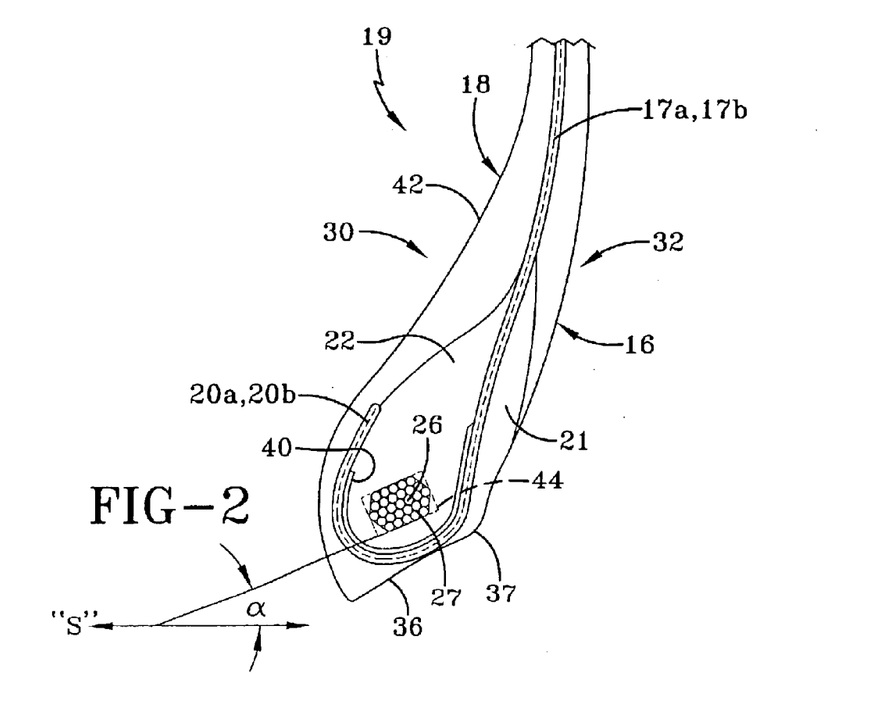
FIG. 2 is an enlarged fragmentary view of one sidewall portion of the tire of FIG. 1.

FIG. 2 shows an expanded cross-sectional view of the bead region 19 of the tire of FIG. 1. A bead 26 that is smaller than prior art bead cores is selected. The cross-sectional shape of the bead cores 26 is confined within a polygonal boundary extending from a flat base. The length is inclined at an angle α in the range of about 15 to 25 degrees relative to an axis "S" of rotation. A flipper ply 40, such as a nylon fabric ply, is wrapped around the bead 26 to prevent the filaments 27 from cutting through the surrounding plies and rubber. The radial down sidewall plies 17a and 17b are routed generally parallel to the exterior 32 of the tire. The radial down sidewall plies 17a and 17b wrap around the bead 26 and terminate in a turn-up end 20a, 20b oriented generally parallel to the interior 30 of the tire.

One measure of the tire's air cavity integrity is "burst strength" which is measured by pumping water into the tire until the weakest link in the reinforcing structure breaks. A burst strength of at least 26 bar and more typically at least 29 bar is desired in a truck tire. The following table provides an example of the bead core reduction that is feasible in accordance with certain embodiments of the invention. For tires having the tire size and number of wires shown in the following table, satisfactory burst strength can be achieved using an outside-in ply with bead cores having the number of wires or the cross-sectional area shown in Table 1:

TABLE 1

| Tire Size Invention | Conventional Winds (No.) | Conventional Bead Area (sq. in.) | Reduced Winds (No.) | Reduced Approx. Bead Area (sq. in.) |
| --- | --- | --- | --- | --- |
| 315/80R22.5 | 57 | 0.23 | 29–33 | 0.12–0.13 |
| 295/75R22.5 | 36 | 0.15 | 19–24 | 0.08–0.10 |

TABLE 1-continued

| Tire Size Invention | Conventional Winds (No.) | Conventional Bead Area (sq. in.) | Reduced Winds (No.) | Reduced Approx. Bead Area (sq. in.) |
|---|---|---|---|---|
| 11R22.5 | 36 | 0.15 | 19–24 | 0.08–0.10 |
| 11R22.5 | 51 | 0.21 | 27–29 | 0.11–0.12 |
| 255/70R22.5 | 34 | 0.14 | 18–24 | 0.07–0.10 |
| 285/75R24.5 | 36 | 0.15 | 18–24 | 0.07–0.10 |
| 11R24.5 | 36 | 0.15 | 18–24 | 0.07–0.10 |
| 11R24.5 | 51 | 0.21 | 27–29 | 0.11–.012 |
| 225/70R19.5 | 20 | 0.08 | 12–16 | 0.05–0.07 |
| 225/70R19.5 | 24 | 0.10 | 13–16 | 0.05–0.07 |
| 245/70R19.5 | 24 | 0.10 | 13–16 | 0.05–0.07 |

A schematic diagram of the embodiment of a tire shown in FIG. 1 in accordance with the invention is illustrated in FIG. 3. The tire may have one or more belts 24. The turn-up ends 20a, 20b of the radial outside-in down sidewall plies 17a, 17b wrap around the bead cores 26 in an outside-in fashion with reference to the exterior 32 and the interior 30. In this embodiment the tire 10 includes an additional crown ply 50 that is located below the belts 24 and spans the gap between the split sidewall plies 17a and 17b. Locating the turn-up ends 20a, 20b in this manner results in an inherent upward force $F_3$ on the bead cores 26. The bead cores 26 rotate in a direction $R_3$ (opposite of $R_1$ present in the prior art) in response to the force $F_3$, causing the toe 36 to press against the rim (not shown). This action increases the burst strength capacity of the tire in comparison to the prior art.

As an example, the reduction in bead size and tire weight of a tire produced according to an embodiment of the present invention, designated C1, is compared to a prior art tire, designated "Control." The metrics are illustrated in Table 2.

TABLE 2

|  | Units | Control | C1 |
|---|---|---|---|
| Number of Bead Wires | Filament Gauge (0.072 inch) | 57 | 29 |
| Weight | Kilograms | 68.5 | 60.6 |

FIG. 2 shows an expanded cross-sectional view of the bead region 19 of the tire of FIG. 1. A bead 26 that is smaller than conventionally used for the size tire is selected. The cross-sectional shape of the bead cores 26 can vary, e.g., the bead may be triangular, rectangular, hexagonal or other shape. In this embodiment it is defined by a polygonal boundary extending from a flat base. A rectangular boundary may be defined by four dashed lines forming a rectangle 44, wherein one dashed line is tangent to the flat base and the remaining three lines are touching at least a point of the peripheral surface of the bead core, the rectangle having a height less than or equal to the length. The length is inclined at an angle α in the range of about 15 to 25 degrees relative to an axis "S" of rotation. The bead 26 typically may be made smaller by reducing the number of filaments 27 but this effect might also be achieved by reducing the wire gauge of the filaments 27. The gauge of the filaments 27 usually range from about 0.050 inches to 0.080 inches but any gauge taught for use in truck tires may be used. The number of filaments 27 in a bead core 26 will vary, depending upon the size of the tire. For example, with an outside-in ply a small truck tire (e.g., 15 inch) may utilize as few as 12 filaments, while larger truck tires (e.g., 24.5 inch) may utilize as few as 45 filaments in one embodiment depending on the size of the tire. More particularly, the number of filaments used may vary from about 15 to 40 filaments. Alternatively, a single filament wound into an annulus having a smaller cross sectional area may be used. In any case, the bead size cross-sectional area reduction from that of prior art truck tires may range from about 25% (and in some cases 30% or 40%) reduction for smaller tires and up to about 60% reduction for larger tires. For example, conventional truck tire beads typically have a transverse cross-sectional area of about 0.06–0.27 sq. in. (15 to 65 wires at 0.072 inch diameter). In accordance with certain embodiments of the invention, this cross-sectional area can be reduced to about 0.05 to 0.18 sq. in. (12 to 45 wires at 0.072 inch diameter). Concomitantly, the weight of the tire can be reduced as much as about 5–7% in small tires to as much as about 10% or more in larger tires.

A flipper ply 40, such as a nylon fabric ply, is wrapped around the bead 26 to prevent the filaments 27 from cutting through the surrounding plies and rubber.

The use of turndown plies is avoided because it has often required the carcass to be fabricated in a manufacturing process that was unreliable or simply too costly to permit feasible production efficiency.

The method of manufacturing the present invention permits the tire to be fabricated on a flat build cylindrically shaped building drum 5 as illustrated in FIGS. 4, 4A and 5A, 5B, and 5C.

Tires 10 are generally formed as a laminated structure of elastomeric strips, some of which are cord reinforced, some of which are unreinforced such as liners, gum strips, apex, chafers, sidewalls and tread rubber. Chippers, flippers, radial plies and belt layers have cords reinforcing the rubber compositions.

Figure 4:
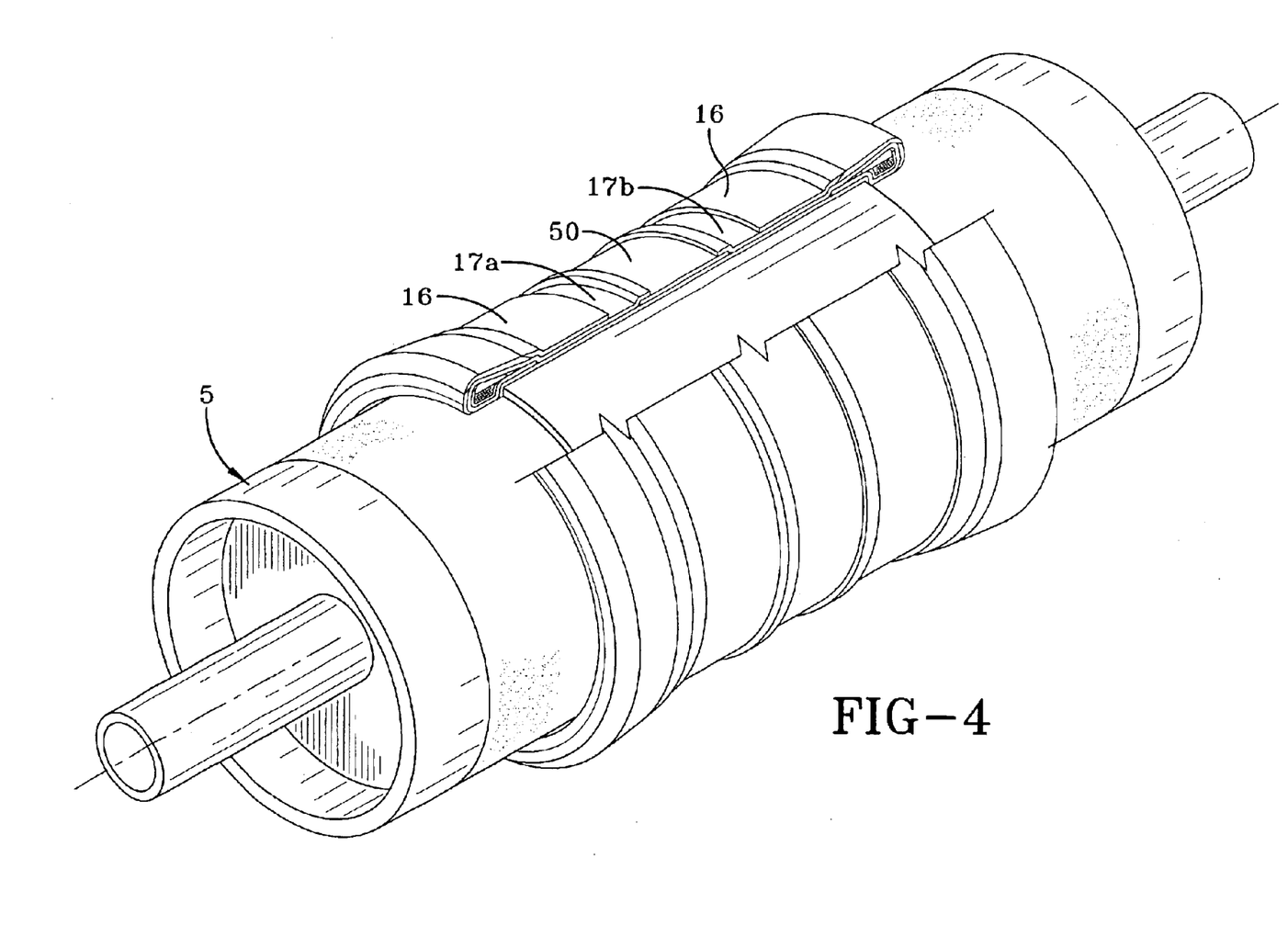
FIG. 4 is a perspective view of the ply shown on a building drum being fabricated employing a first method of assembly.
Figure 4A:
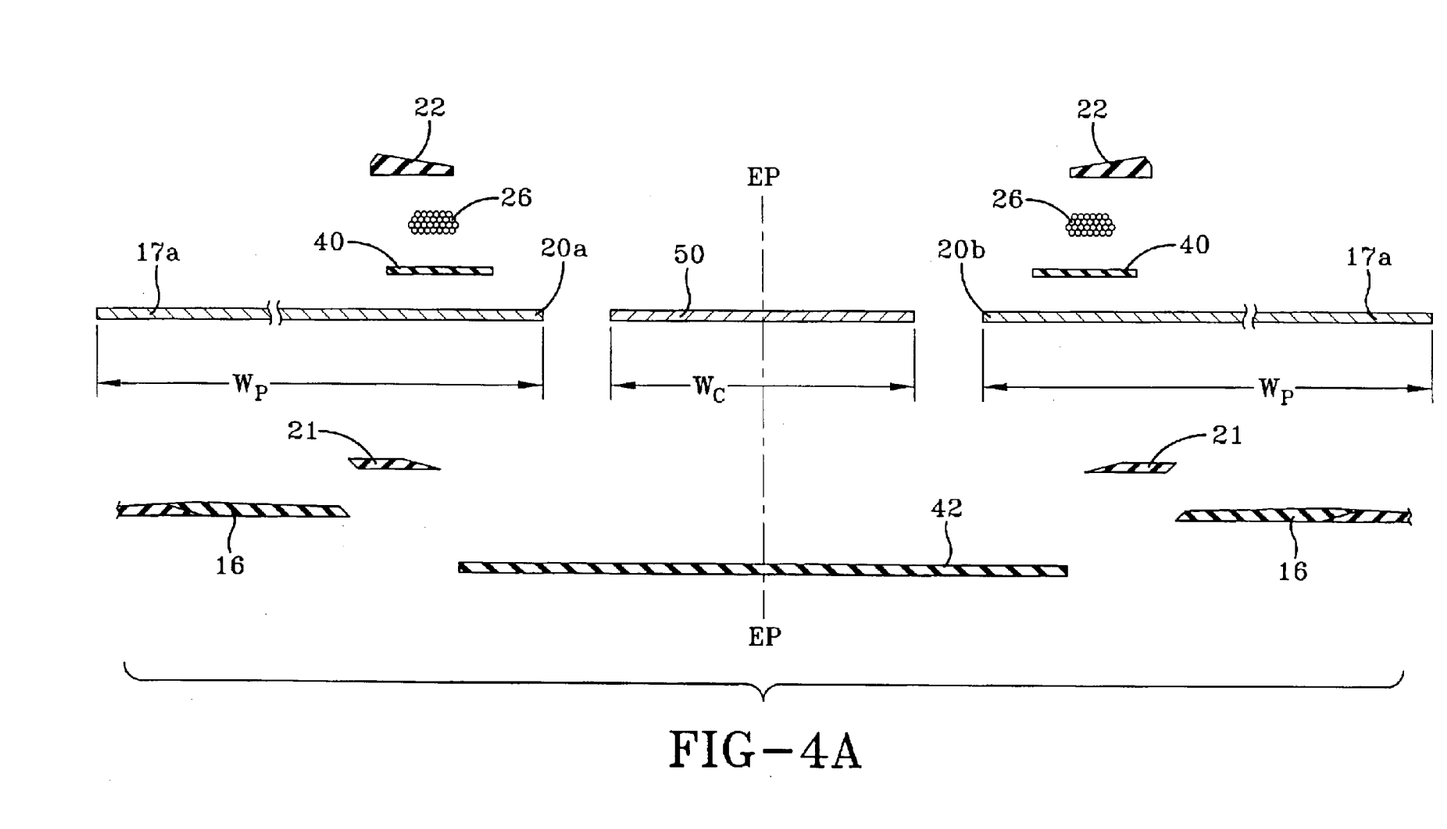
FIG. 4A is a schematic cross-sectional view of the carcass components oriented to the preferred method.
Figure 5A:
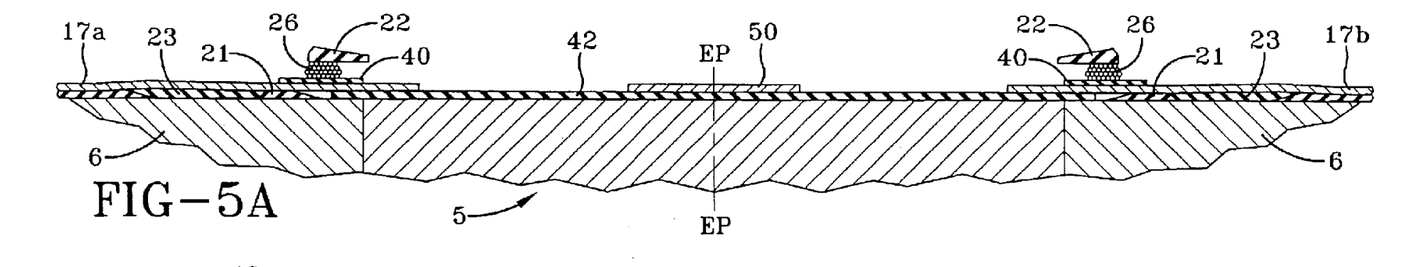
FIGS. 5A, 5B and 5C are schematic views of the tire carcass of FIG. 3 being made according to the method of the present invention.
Figure 5B:
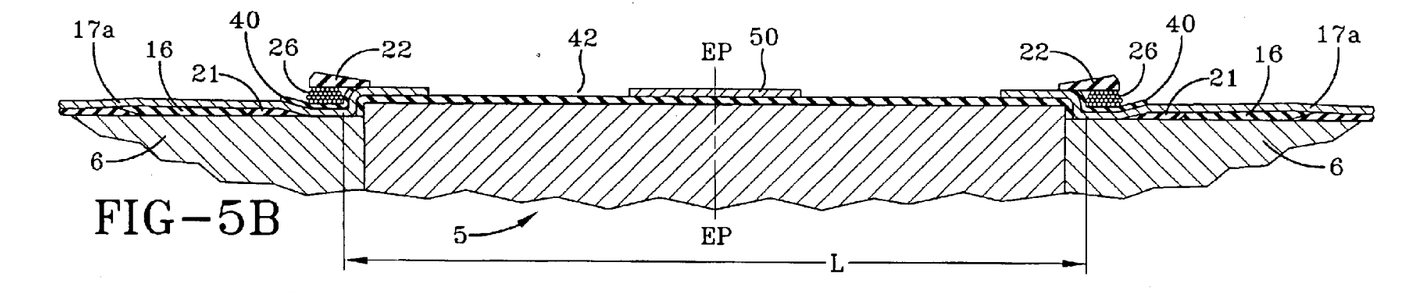
Figure 5C:
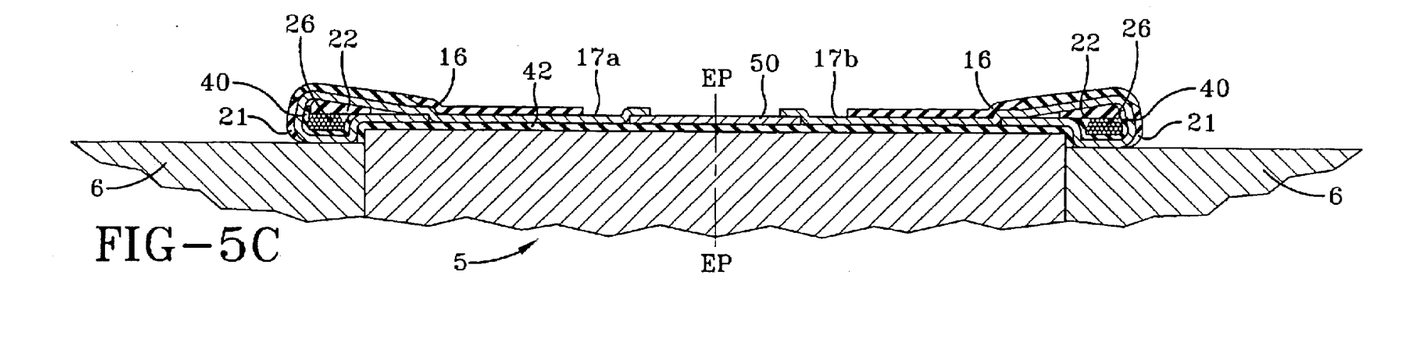

As shown in FIG. 4A, an option liner layer 42 may first be applied to the building drum 5. A crown ply 50 preferably reinforced with steel cords or a synthetic textile cord of polyester, nylon or rayon is applied to the building drum 5 and centrally positioned in the centerline as shown. A pair of sidewall ply layers 17a, 17b are applied onto the building drum with the axially inner turnup ends 20a, 20b being spatially separated from the crown ply 50. As shown the crown ply 50 may be placed before or after the pair of sidewall plies 17a, 17b.

An optional pair of flipper strips 40 can be located in an area approximated at the location of the bead cores 26 if so desired.

The bead cores 26 are then passed over the building drum 5 over the cylindrically formed components and placed on the drum 5 at a predetermined spacing L between the bead cores. Preferably the bead cores are locked into position on the building drum.

At each end of the building drum 5 is a means 6 for turning up and folding over the sidewall plies 17a, 17b. When the means 6 is activated the sidewall plies 17a, 17b are folded overlapping lateral edge portions 50a and 50b of the crown ply 50 on each side. The assembly can then be stitched securing the carcass assembly 18.

A pair of rubber sidewall strips 16 can be applied preferably overlying, the sidewall plies 17a, 17b below the overlap with the crown ply 50.

The carcass assembly 18 may have had a pair of chafer strips 21 applied in an area directly below the beads as an initially applied component.

Once all the carcass components are assembled, the carcass assembly 18 can be toroidally shaped by moving the beads 26 and carcass components axially inwardly as the assembly is expanded radially to a toroidal shape. This shaping folds the turnup ends 20a, 20b radially outwardly along the axially inner portion of the beads 19 adjacent the flipper 40 and apex 22 as shown in FIG. 2.

A first belt layer 24a is then applied to the carcass covering the crown ply 50 and the overlapping portions of the sidewall plies 17a, 17b. This overlapping belt layer 24a provides additional structure to hold the assembly together. The belt layer has a width $W_{B1}$, as shown. A second narrower in width belt layer 24b having cords inclined opposite the first layer 24a can then be applied. That second belt layer has a width $W_{B2}$. If the first belt layer has cords oriented at about 0° then a second and third belt layers 24b and 24c may be employed as an alternative construction.

The resultant method yields a tire as illustrated in FIGS. 1 through 3. As shown in FIG. 3 the ends of plies 17a and 17b are sandwiched between the crown ply 50 having a width $W_C$ and the first belt layer 24a. As illustrated the first belt layer has a width $W_{B2}$ at least equal to the crown ply 50 width $W_C$. The ends of the plies 17a and 17b are gapped spaced a distance $S_S$ wherein $S_S$ is narrower than the second belt layer $W_{B2}$ as shown.

This construction creates a very strong mechanical structure in the crown area of the tire and insures the ends of plies 17a and 17b are moved well inboard of the highly flexed tread shoulders 14 and directly inward of the crown portion of the tread 13 and belt reinforcing structure 29.

What is claimed is:

1. The method of building a tire having a carcass assembly having a pair of bead cores and a radial ply reinforcing structure; the method comprises the steps of:

cylindrically applying a pair of radial cord reinforced sidewall plies, each sidewall ply having a width W;

setting one bead core over each sidewall ply and fixing the axial spacing between the bead cores at a distance L;

applying a crown ply having a width $W_C$, $W_C$ being less than the distance L and the crown ply being interposed between and spaced from each sidewall ply;

turning up each sidewall ply to overlap lateral edges of the crown ply;

moving the carcass assembly axially inwardly while shaping the carcass assembly toroidally to form ply turnups axially inwardly of the bead cores.

2. The method of claim 1, further comprises the steps of:

applying a first belt reinforcing layer to the toroidally shaped carcass, the first belt reinforcing layer having a width $W_B$, the first belt reinforcing layer overlaps the radially outer ends of the sidewall plies.

3. The method of claim 2, further comprises the steps of:

applying one or more additional belt reinforcing layers to the carcass and first reinforcing layer;

applying a tread.

4. The method of claim 1, further includes the steps of:

stitching the overlap of the sidewall plies to the crown ply.

5. A pneumatic radial ply tread tire comprising:

a pair of axially-spaced bead cores;

a carcass having a pair of sidewall plies and a crown ply, each ply being reinforced with parallel radially extending cords, the sidewall plies extend axially outward along the sidewall partially overlapping the crown ply and extending radially inwardly to the bead core and folded from a position axially outside the bead cores to a position axially inside and around the bead cores to an axially inner turnup end;

a belt reinforcing structure having at least two cord reinforced belt layers a first radially inner belt layer and a second radially outer adjacent layer, the first radially inner belt layer overlapping the crown ply and a radially outer portion of the sidewall plies; and a tread wherein the sidewall plies are reinforced with steel cords.

6. The pneumatic radial ply tire of claim 5 wherein the crown ply is reinforced with substantially inextensible cords made of steel or aramid.

* * * * *